United States Patent [19]

Fisher et al.

[11] 4,106,193
[45] Aug. 15, 1978

[54] ROTARY SCRAPER WITH NON-GOUGING FINGER ARRAY

[76] Inventors: Leonard Fisher, 42 Spriteview Ave., Westport, Conn. 06880; James E. Richardson, 28 Ladder Hill Rd., Weston, Conn. 06883

[21] Appl. No.: 791,307

[22] Filed: Apr. 27, 1977

[51] Int. Cl.² .................. A47L 13/08; A22C 25/02
[52] U.S. Cl. .................. 30/172; 15/93 R; 15/236 C; 144/115; 17/67
[58] Field of Search .................. 30/172; 51/334, 335, 51/336, 337; 144/115; 15/93 R, 236 B, 236 C; 17/64, 67

[56] References Cited

U.S. PATENT DOCUMENTS

| | | | |
|---|---|---|---|
| 1,752,156 | 3/1930 | Endorf | 144/115 |
| 2,725,694 | 12/1955 | Lukens | 51/337 |
| 3,082,452 | 3/1963 | Heine | 15/93 R |
| 3,958,294 | 5/1976 | Thompson | 15/236 C |

Primary Examiner—Jimmy C. Peters
Attorney, Agent, or Firm—Ostrolenk, Faber, Gerb & Soffen

[57] ABSTRACT

A rotary scraper including a spool with fingers integral therewith and projecting radially therefrom, with the fingers striking the work surface as the wheel rotates, thereby to impact the work surface; the fingers are arranged in a plurality of comb-like structures with the base of each comb inserted in a slot parallel to the axis of the spool. Each comb is locked in place by a cylindrical cover for the spool having a slot displaced radially from the slot in the spool into which each comb is inserted. Each comb is therefore held in place by the S shaped bend thus induced and is curved away from the direction of rotation from the spool. The fingers of each comb are relatively flexible. The curved portion of each comb outside the cover acts as a support for the fingers of the next adjacent comb should they be flexed inwardly beyond the desired point.

7 Claims, 7 Drawing Figures

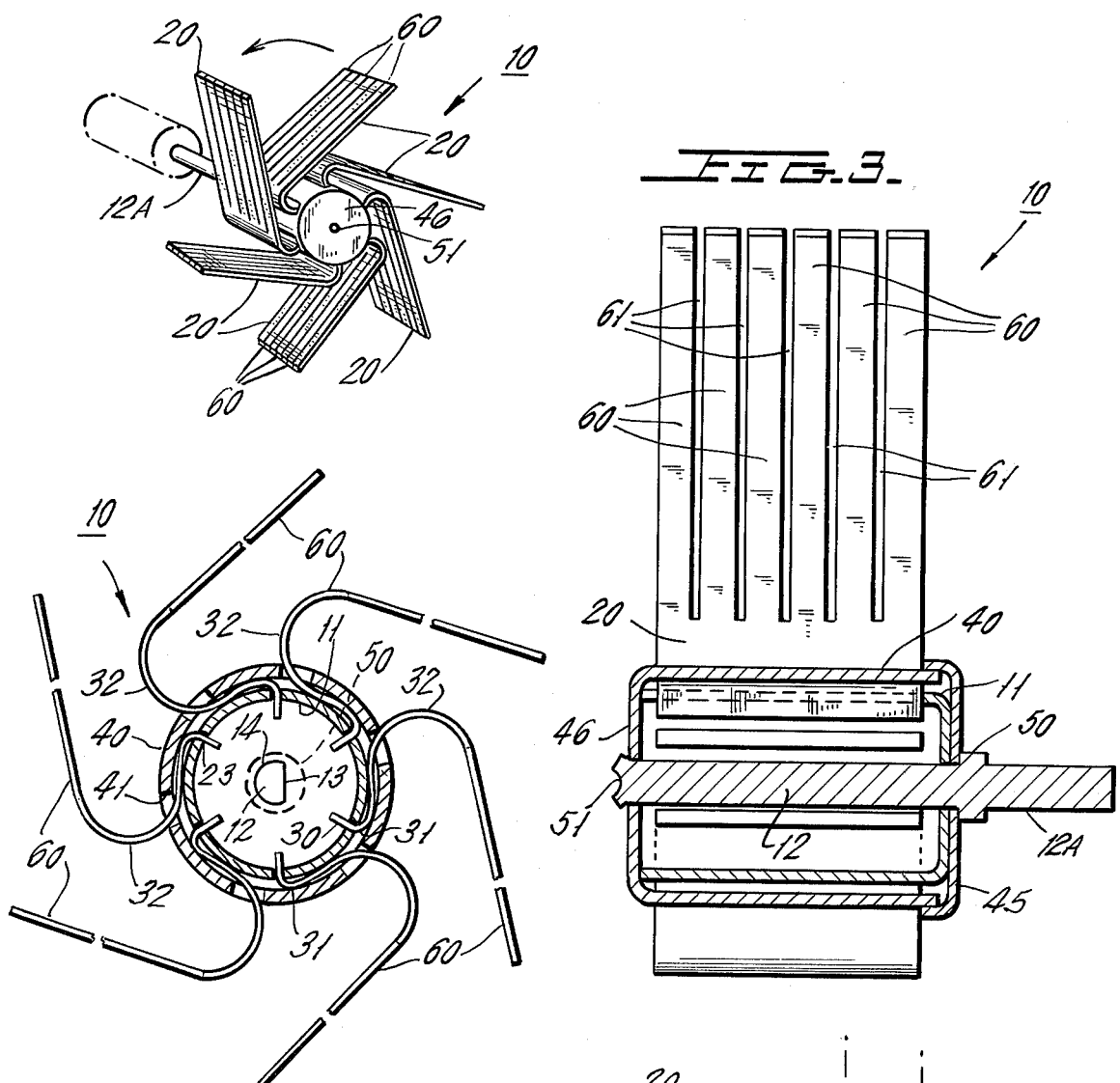

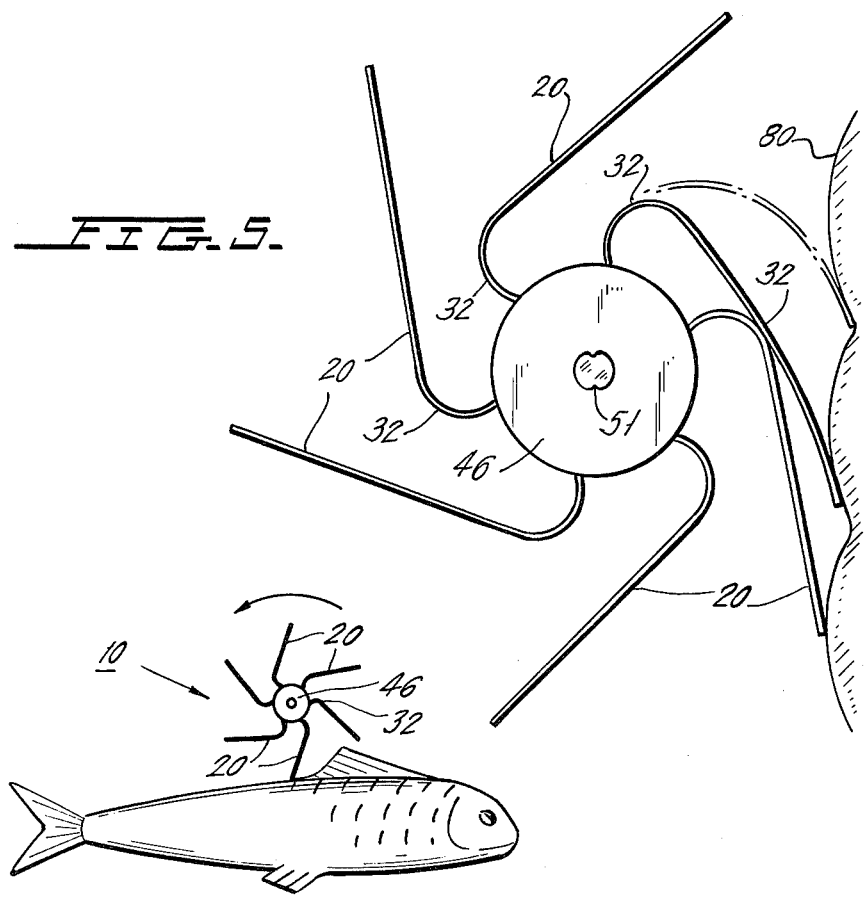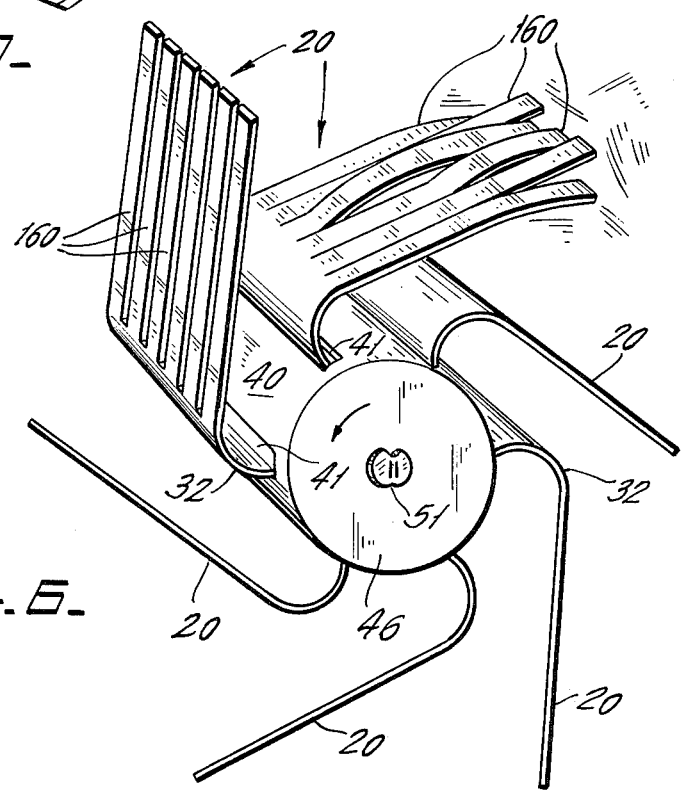

ROTARY SCRAPER WITH NON-GOUGING FINGER ARRAY

BACKGROUND OF THE INVENTION

The present invention relates to a rotary scraper for treating a surface, wherein the scraper comprises a plurality of fingers projecting from a spool and the rotation of the spool impacts the fingers against the surface being scraped.

The rotary scraper is usable in various applications where scraping is desired, including removal of paint, burnishing of metal, removal of a surface layer and even removal of fish scales. In many of these situations, the surface layer to be removed is comprised of harder material than the layer beneath it which is not to be damaged, whereby if the rotary scraper has a gouging effect, once it removes the surface layer, it can do great damage to the softer layer beneath, as might occur in fish scaling, for example.

One problem with known rotary scrapers is that their fingers gouge the work surface if the scraper is not handled with great care. Various attempts have been made to eliminate gouging, including restraining the fingers from assuming undesired radial extension under the influence of centrifugal force and forming the fingers, or the means by which the fingers are attached to the spool, of resilient elastomeric material; or by making the fingers completely flexible and providing an abrasive surface at the ends thereof. See for example, U.S. Pat. Nos. 3,958,294 and 3,872,630.

In known rotary scrapers, the fingers are arrayed in a plurality of rows of fingers, angularly spaced apart around a spool. Each row of fingers extends longitudinally across the spool in a row generally parallel to the axis of the spool. Typically, each row of fingers is comprised of the same number of fingers and/or all of the fingers in each of the angularly spaced apart rows are at the same respective longitudinal positions across the spool, whereby any cross section through the spool and through any fingers of any row of fingers will also pass through the corresponding finger on every other row. When the scraper spool is rotated rapidly, and if the scraper is held stationary in use for any significant period, the work surface will be gouged by all of the aligned fingers striking the surface at the same spot and tracking a single swath across the work surface.

Typically, the fingers of the rotary scrapers are generally circular in cross section, whereby their leading impacting edge is quite narrow and relatively sharp. This increases the gouging effect.

SUMMARY OF THE INVENTION

The present invention has as its primary object the provision of a rotary scraper including fingers which are rotated past a work surface.

It is another object of the invention to provide such a rotary scraper which minimizes gouging of the work surface.

It is a further object of the invention to provide such a rotary scraper, wherein the fingers are arranged to reduce gouging of the work surface.

It is another object of the invention to reduce the force of the impact of the fingers of the rotary scraper on any spot on the work surface.

It is a further object of the invention to shape the fingers to avoid gouging of the work surface.

It is another object of the invention to provide such a rotary scraper, which can effectively scrape a harder surface layer off a softer layer beneath without damaging the softer layer.

It is another object of the invention to provide such a scraper, which would be effective in removing fish scales.

It is a further object of the present invention to provide a plurality of scraper fingers each mounted on a comb; one or more such combs are held in a slot in the spool, each such comb being curved to enter through a cover slot radially displaced from the slot in the spool.

It is another object of the invention to so arrange the combs and fingers so that, at a desired maximum deflection of the fingers, each set of fingers will be supported by a bend in the combined adjacent thereto.

In accordance with the present invention, the rotary scraper is comprised of a rotatable spool which may be rotated by a conventional spool rotating means, such as a rotatable shaft.

The spool is provided with a plurality of longitudinal slots and a cover member having an equal number of slots with the cover slots being displaced radially from the first mentioned slots. One or more combs may be slid into each spool slot. The combs are provided with an S bend in which the end of the S enters the spool slot and the opposite curve of the S extends out of the cover slot. This part of the comb is relatively rigid and serves as a support for the fingers of an adjacent comb or combs when they are flexed beyond a desired maximum. The cover is itself secure in place by the shaft which carries the spool and thus secures the combs in position.

The foregoing and many other objects of the present invention will become apparent in the following description and drawings, in which:

FIG. 1 is a view in perspective of the novel scraper of the present invention.

FIG. 2 is a cross-sectional view of the novel scraper of the present invention.

FIG. 3 is a side-view partly in section of the scraper of the present invention.

FIG. 4 is a view corresponding to that of FIG. 2 showing a modified form and various modes of scraper operation.

FIG. 5 is an end view of the scraper corresponding to the cross-sectional view of FIG. 2 showing another mode of operation of the scraper.

FIG. 6 is a view in perspective showing the fingers of the combs flexed at different positions on an irregular surface.

FIG. 7 is a schematic view showing the utilization of the novel scraper of the present invention for scaling a fish.

Referring to the figures, the rotary scraper 10 comprises a spool 11 mounted on shaft 12, and appropriately keyed thereto. In this case, for instance, the shaft 12 has a flat 13 and the spool 11 is provided with an appropriate corresponding flat in its center bore 14 in order to provide appropriate driving relationship between the spool and the shaft.

The scraping fingers comprise a plurality of combs 20 which may be mounted in the slots 23,23 of the spool 11.

In FIG. 3, a single comb is shown mounted in each slot. Where desired, two or more combs may be mounted in each slot adjacent each other.

Each comb, comprises a base section 30 a first curved section 31 and a second section 32 curved on a much larger radius then the first curved section 31. It will thus be seen that when the base section 30 of each comb is slid longitudinally into a slot 23 of the spool, such base section will be positioned in the spool. Radial movement out of the spool is prevented by the spool cover 40 which is provided with a plurality of slots 41,41, each displaced angularly from a related slot 23 of the spool. The larger curved radius 32 of each comb passes through each such respective slot of 41,41 when the cover is in place. By this means, each of the combs and its associated fingers is prevented from being displaced radially. As seen in FIG. 3, the shaft 12 in addition to carrying the spool 11 and the cover 40, also is provided with an end plate 45, which is held on the shaft. The cover 40 has its own base plate 46 which is preferably integral therewith so that the cover is essentially cup shaped.

In assembling the device, plate 45 is first placed on the shaft 12, then the spool 11 is placed on the shaft 12, thereafter each of the combs 20, is inserted in the appropriate slot 23, thereafter the cover member 40 is placed on the shaft 12. All of the elements are driven to the right with respect to FIG. 3 so that they rest against the boss 50 on the shaft 12. The opposite end of the shaft 12 at 51 is then upset with an appropriate tool to form a rivet type retainer for the base 46 of the cover 40 and the entire unit is thus integrated. The extension 12a of the shaft 12 may now be inserted into the chuck of any hand held drill or other rotating tool which will rotate the entire unit in a counterclockwise direction with respect to FIGS. 1, 2, 4, 5, 6 and 7.

Each of the combs 20, is provided with fingers 60, each of the fingers 60 is relatively flexible but its also preferably integral with the base 20, of each of the combs. The relative flexibility is obtained by reason of the fact that the fingers 60 are separated by the slots 61.

When the structure is rotated in a counterclockwise direction and the fingers are brought up against any surface, the fingers will scrape that surface. The degree of scraping is controlled by the user in accordance with amount of pressure exerted in a direction perpendicular to the axis of shaft 12. Because of the flexibility of the fingers 60 and the spacing 61 between them, it will be seen that a ridged or irregular surface 80, such as that shown in FIG. 5 may readily be operated on; and where the irregularities happen to be parallel to the path of movement of the figures 60, the fingers will be flexed in accordance with the variations in the depth of the surface, as shown by the flexing of fingers 160,160,160 in FIG. 6.

Where the unit is utilized to scrape a surface, as for instance a wall, or a table-top, variations in lateral pressure will determine the degree of the scraping and a skilled user will quickly learn to exert such pressure as will only scrape to the desired depth, without scraping beneath that surface. Thus, for instance, the structure of FIGS. 1-6 may even be used in connection with a surface which is relatively hard, to scrape that surface on a relatively soft support section.

Therefore, in scraping the fish shown in FIG. 7, a skilled worker will quickly learn to utilize the scraper so that it will use sufficient pressure to remove the scales without injuring the body of the fish.

FIG. 4 shows a slight modification of the structure of FIGS. 1-3, 5 and 7 in which the spool 111 is shown as hexagonal and the cover 140 is likewise shown as hexagonal having however, the same types of openings 123 and 141. It will here be seen that slot 123A of the hexagonal spool 111 receives the end 30 of comb 20 which will exit through slot 141A of the cover. As many sides are utilized for the spool and cover as will equal the number of sets of combs or fingers at any particular location parallel to the axis of the shaft 13. Where the slots 123 in the hexagonal spool are located at the corners, then the slots 141 in the cover will be located in the sides and vice-versa.

FIG. 4 further shows a method of operation of the scraper which is equally applicable to the structure shown in FIGS. 1 to 3 and 5-7 and that is the flexing of fingers in accordance with the pressure exerted in a direction transversely of the shaft 12 is shown.

When, for instance, the scraper is moved lightly against the wall 200 the fingers are flexed only minimally and less scraping pressure is applied. When the fingers are moved further in to the wall location 201 the fingers are flexed at a greater angle and a greater scraping pressure is applied. When the fingers are moved further into the wall location 202, maximum scraping pressure is applied and this would be utilized for the removal of very solidly coated surfaces with a relatively stiff support thereunder. Should the scraper be moved further towards the wall, it will be noted that each of the fingers contact the top of the bend 32, providing a support for the fingers so that they cannot be pushed in further towards the shaft 12 of the spool and providing a maximum scraping setting for the fingers.

By this means therefore, a scraper is provided which may readily scrap a plane surface, surfaces which are irregular in the direction of the scraping operation, surfaces which are irregular in a direction normal to the scraping operation and irregular surfaces which are fully irregular without having any specific orientation of the irregularity. The combs 20 and associated fingers 60 may be arranged to have various types of flexibility and various types of structure for various expected operations. Thus, a scraper intended to scrap relatively light coatings or coatings on relatively soft material may be arranged to have a comb of relatively thin and more flexible material then a scraper intended to be applied to the scraping of relatively heavy coatings on relatively sturdy bases. However, it has been found that with appropriate use and practice, appropriate skills are acquired to enable the operator to scrap any type of coating from any type of surface with a single scraping structure.

In the foregoing, the present invention has been described in connection with specific preferred embodiments thereof. Since many variations and modifications of the present invention will now be obvious to those skilled in the art, it is preferred that the scope of this invention be defined, not by the specific disclosure herein contained, but only by the appended claims.

What is claimed is:

1. A rotary scraper comprising a spool and a shaft said spool being secured to said shaft
 a plurality of sets of relatively flat fingers secured to said spool and extending radially therefrom
 said sets of fingers being substantially parallel to each other
 and being spaced radially about said spool;
 each set of fingers extending in a region parallel to said axis of said shaft;
 said shaft being rotatable in a predetermined angular direction;

said fingers being inclined in said region so that their ends trail the points of connection to said spool during rotation;

the spool being provided with a plurality of slots substantially parallel to the shaft;

the base of each finger being received in one of said slots and being held therein;

a cover member being secured over said spool;

said cover member having a plurality of slots equal to the number of slots in said spool and displaced circumferentially from said spool slots;

each finger having a base section entering a spool slot, a section extending substantially circumferentially of said spool and a section bent out radially into and through the corresponding cover slot.

2. The rotary scraper of claim 1 wherein, each finger is curved beyond said cover slot in a direction trailing the direction of rotation.

3. The rotary scraper of claim 2 wherein, the curve of each finger establishes a maximum position of inward displacement of the next radially adjacent flexible finger on said spool.

4. The rotary scraper of claim 2 wherein the fingers in any one pair of slots in the spool and cover have a common base extending at least into said spool slot and forming a comb structure.

5. The rotary scraper of claim 4 wherein the said spool and cover are cylindrical.

6. The rotary scraper of claim 4 wherein the said spool and cover are polygonal.

7. The rotary scraper of claim 6 wherein the set of slots in the spool are each adjacent the junctures of the sides of the polygon and the other set of slots in the cover are each between the juncture of the sides of the polygon.

* * * * *